Oct. 30, 1951 E. H. PIRON 2,573,108
RAIL TRUCK SUSPENSION
Filed July 3, 1947 4 Sheets-Sheet 3

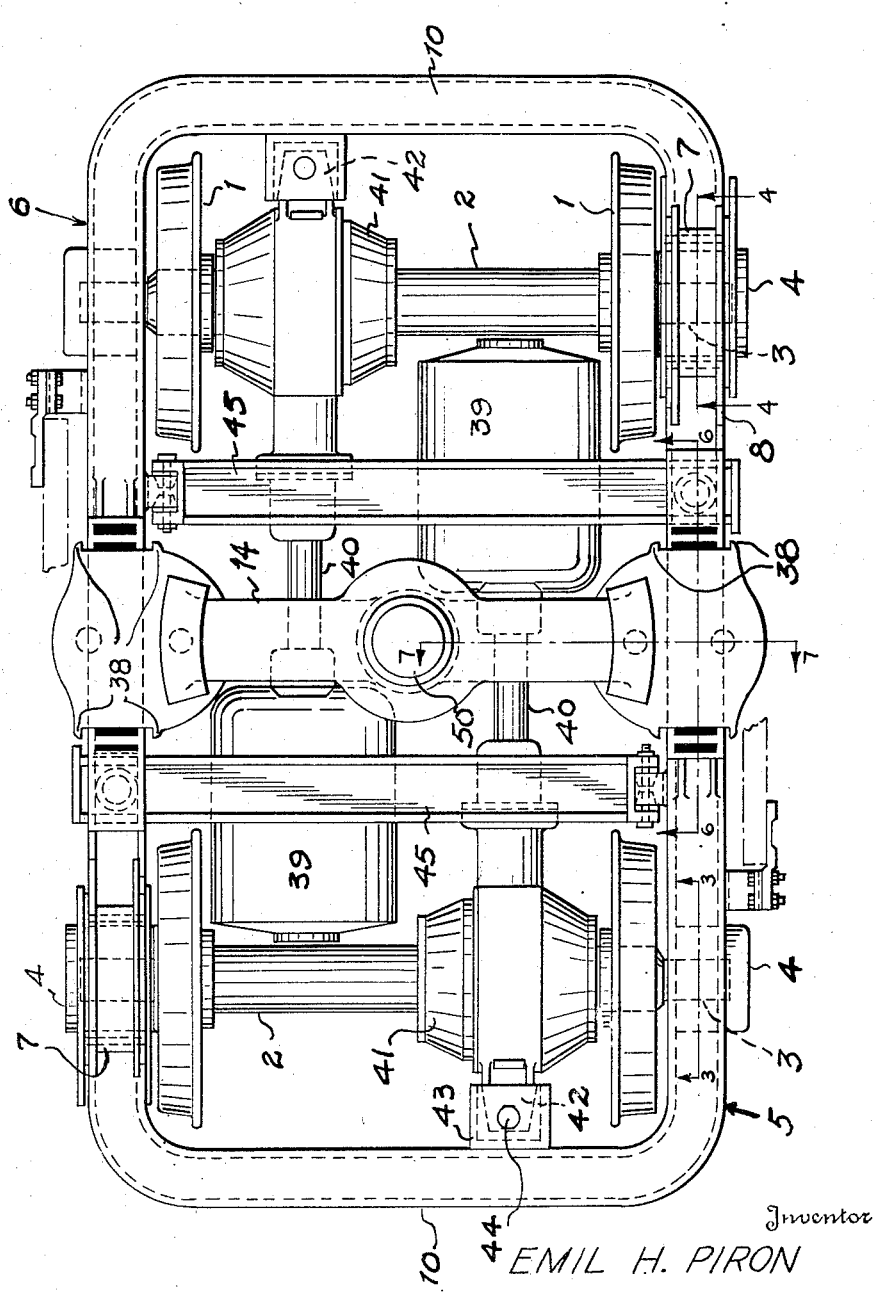

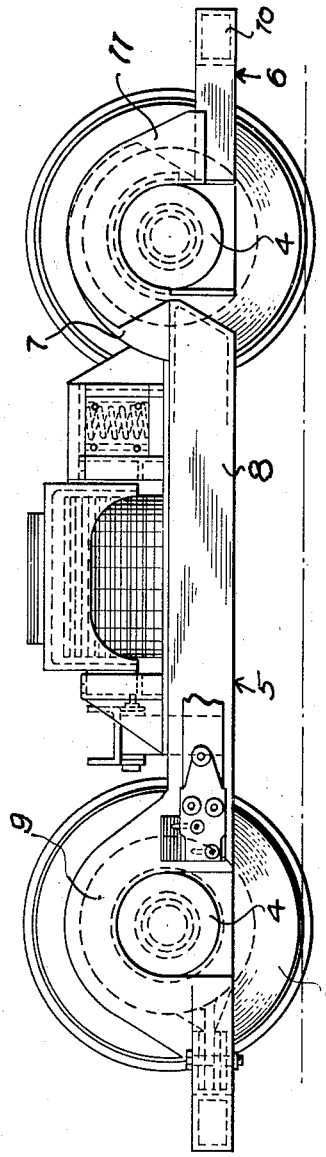
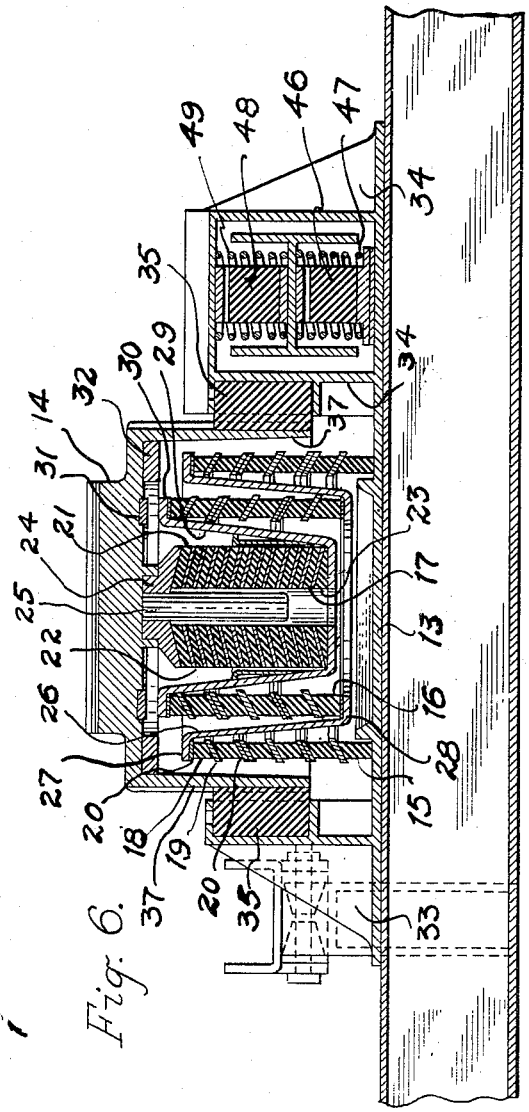

Inventor
EMIL H. PIRON
Attorney

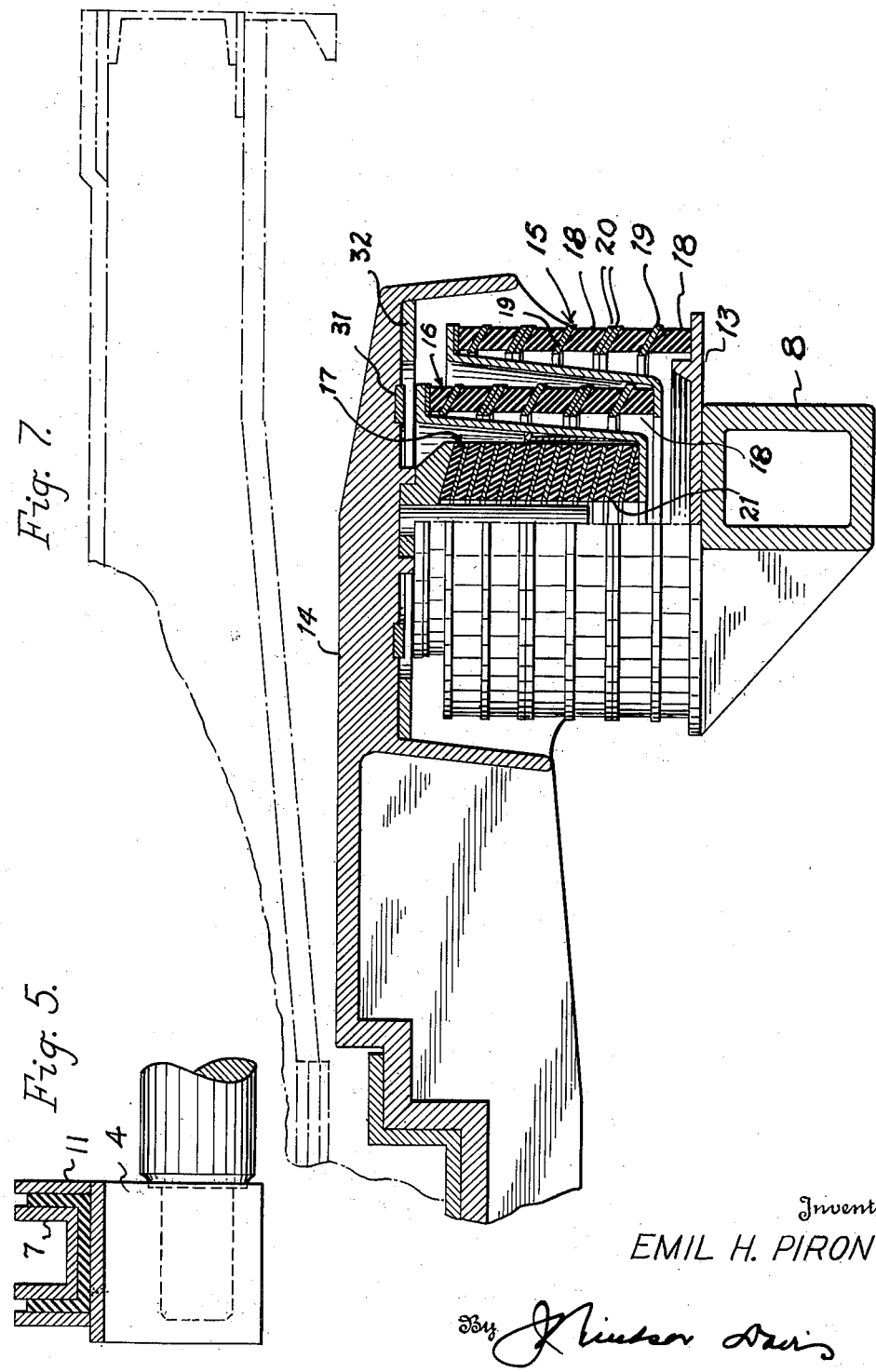

Patented Oct. 30, 1951

2,573,108

UNITED STATES PATENT OFFICE 2,573,108

RAIL TRUCK SUSPENSION

Emil H. Piron, New York, N. Y., assignor to Transit Research Corporation, New York, N. Y., a corporation of New York Application July 3, 1947, Serial No. 758,941

3 Claims. (Cl. 267—3)

This invention relates to rail trucks intended for moderately high speed and high speed, which may or may not carry self-propelling motors and has for its object to provide an improved truck which will give improved operation and which will give improved riding comfort particularly at higher speeds.

An important object of the invention is to provide a truck having outboard bearings, the frame for which is composed of two main parts hingedly connected at diagonally opposite journal bearings. The frame is thus rigid against distortion in a horizontal plane but flexible vertically. The two frame parts rest freely on the journal bearings and upon each other, the frame being maintained in assembly merely by its weight and the weight of the car body supported thereby.

The bolster springs constitute essentially the truck springing system and a further important object is to provide improved springs for supporting each end of the bolster from the side rails of the truck frame. These springs are each composed of nested springs acting in series, with each spring in the series being limited in its extent of deflection under vertical loading. The spring can thus be given load deflection characteristics by which substantial deflection occurs under light loading and increasingly stiffer resistance to increasing loading.

Another object is to provide improved vibration damping and a resistance to the transmission of short wave vibrations between the truck and the car body supported thereon by separating the truck frame halves by rubber, by forming the bolster springs of rubber and by employing rubber pads fore and aft of the bolster, these pads having the dual function of serving both as friction means opposing motion of the bolster with respect to the frame and as transoms for assisting in transmitting driving and retarding forces between the bolster and the frame. For most uses shock absorbers will not be needed although they may be added between the bolster and the frame if desired.

Figure 3:
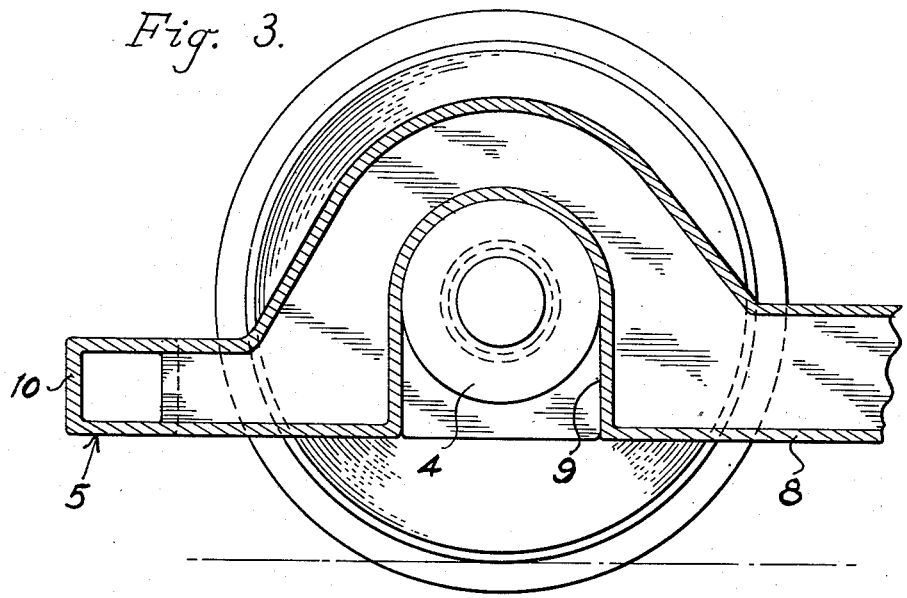
Figure 4:
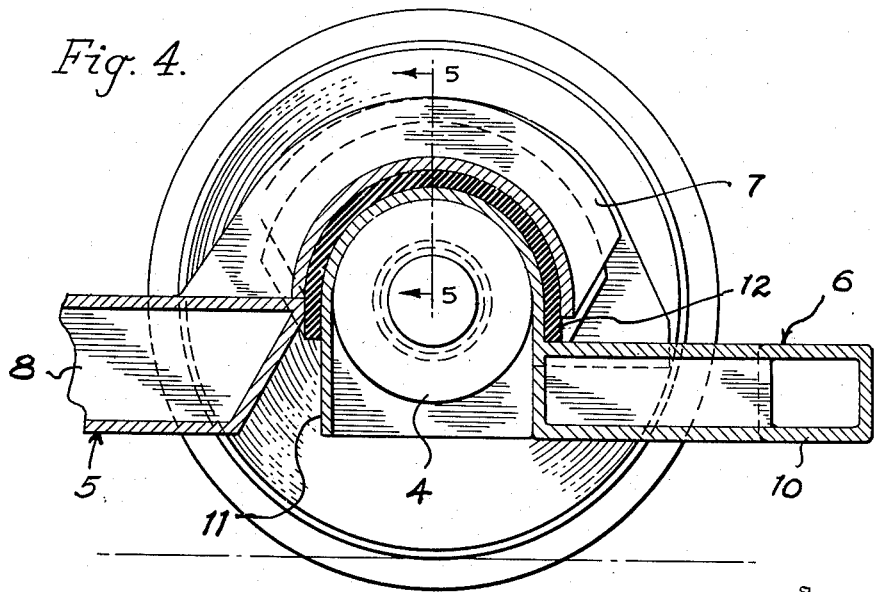

Other objects and advantages will become hereinafter more fully apparent as reference is had to the accompanying drawings in which my invention is illustrated and in which Figure 1 is a top plan view of my improved track, Figure 2 is a side elevation thereof, Figure 3 is a detail longitudinal section of the truck frame taken along the line 3—3 of Figure 1, Figure 4 is a detail longitudinal section of the truck frame taken along the line 4—4 of Figure 1, Figure 5 is a detail cross-section of the truck frame taken along the line 5—5 of Figure 1, Figure 6 is an enlarged diametric section through a bolster spring taken along the line 6—6 of Figure 1, and Figure 7 is a longitudinal section through one end of the bolster taken along the line 7—7 of Figure 1 and showing the spring partially in elevation and partially in section.

More particularly, 1 indicates each of the four wheels of the truck which support two axles 2. The axles have outboard bearings 3 at each end thereof fitting into bearing boxes 4 which support the truck frame.

The truck frame is composed of two identical frame halves 5 and 6 each consisting of a goose neck end 7, a side rail 8 integral with the goose necked end 7, and having a second goose necked portion 9, a cross rail 10 and a second goose necked end 11. A journal box 4 at one end of one axle 2 fits into the end 11 of one frame half and the journal box 4 at the opposite end of the other frame half, and the journal box 4 at the opposite end of the other frame half fits into the corresponding end 4 of the other frame half. The end 7 of each frame half overlies the end 11 of the other spring half, being separated therefrom by a rubber pad 12. The goose necked portions 9 of each frame half receive the other two journal boxes 4 located at diagonally opposite corners of the truck.

With the frame as just described it will be noted that no fore and aft relative motion between the axles 2 and the frame is contemplated. It will also be noted that the rubber pieces 12 are merely pads and that no horizontal relative motion between the end 7 of one frame half and the adjacent end 11 of the other frame half is contemplated. However, the top of the ends 11 is semi-cylindrical as is also the interior surface of the ends 7 with the result that any one of the four wheels of the truck may be elevated or depressed from the plane of other wheels. The frame is thus rigid against distortion by horizontal forces but flexible in a vertical direction.

Furthermore, the sidewalls of the goose necked portions 11 and 9 are parallel below their semi-cylindrical bearing box receiving portions, with the result that the two frame halves may be separated from each other and from operative connection with the journal boxes by vertically lifting them.

Intermediate the length of the side rails 8, platforms 13, as shown in Figure 7, are provided for the support of the composite bolster springs, one spring supporting each end of the bolster 14. These springs are each composed of three concentric springs 15, 16, and 17, the outer one 15 and the intermediate one 16 of which are each composed of a circular stacked series of frusto-conical rings 18 of rubber. For facility of manufacture the rings 18 are made in pairs, with the members of each pair being surface bonded to a common separating metallic ring 19 and the other surfaces surface bonded to additional metallic rings 20. The rings 20 of one pair are dowelled or otherwise secured to the adjacent ring 20 of the adjoining pair.

The frusto-conical shape of the rings is recommended since this shape gives increased stability as compared with horizontal placement of the metal rings. In the shape illustrated vertical forces are resisted by the rings acting in compression and horizontal forces are resisted by the rings acting partly in shear and partly in compression, the greater the conicity of the rings the greater is the resistance to horizontal forces by compression.

The interior spring 17 is also composed of a stack of frusto conical rings 21 of rubber separated by metallic rings 22 of the same shape. Since these rings 21 and 22 are substantially wider than the rings 18 and 19 they need not be surface bonded but may be simply stacked on a base piece 23 of proper shape to receive the lowermost ring 22 and capped by a top piece 24 which fits the upper contour of the top ring 21. Extending downwardly into the spring 17 is a shaft 25 which acts as a safeguard against possible relative displacement of the rings.

The outer spring 15 rests upon the platform 13 and, at its top, supports a cup 26 by its rim 27, the cup being open at its bottom except for a bottom rim 28 which supports the spring 16. A second cup 29 is supported by its top rim 30 on the spring 16 and this cup 29, in turn, supports the spring 17. The bolster 14 is formed to receive the top of the top piece 24 so that the weight of the bolster is carried, under light load conditions, solely by the top pieces 24. As the loading increases all of the springs 17, 16 and 15 deflect jointly, since they are in series. After a substantial deflection, that is, under increasing loading, it is desirable that the load deflection ratio of the springs increase and I therefore provide individual stops for the springs so that the springs progressively cease to perform any springing function beyond a predetermined deflection of each thereof. Thus, the stop rings 31, carried by the bolster will contact the rim 30 of the cup 29 to bottom on the platform 13 thus limiting the maximum possible deflection of the spring 15.

The load deflection curve of these composite bolster springs, initially, is thus that of a soft rubber in compression and, after contact of the rim 30 with the stop 31 it is a similar curve but becomes steeper, and after contact of the rim 27 with the stop 32 the curve is still similar but steeper yet.

The bolster springs are capable of horizontal deflection to permit springing movements by the bolster. Were the rings 19 horizontal the load deflection curve would be a straight line typical of shear. Because of the frusto-conical shape of these rings the resistance of the springs is a combination of shear and compression. Since the shear characteristic is substantial the load deflection curve is substantially flatter than the curve representative of the vertical deflections. In other words, the bolster springs offer less resistance to lateral than to vertical deflection.

In order to damp the swinging movements of the bolster and also to provide a transom-like driving connection between the frame and the bolster, I provide a bracket 33 and 34 respectively fore and aft of each bolster spring, each of these brackets having a pocket or seat formed therein to receive a rubber block 35. The bolster has skirts 37 for rubbing engagement with the blocks 35. After wear, shims may be inserted behind the blocks 35 so that they will always have rubbing engagement with the bolster. The bolster is provided with flanges 38 (Figure 1) for contact with the brackets 34 and 35 in case of a tendency of the bolster to swing excessively in either direction.

Driving motors 39 each has a propeller shaft 40 for driving gears (not shown) contained in the axle housings 41 and a torque arm 42 extends from each housing 41 into a bracket 43 carried by a cross member 10 of the frame. The torque arms are connected to the brackets 43 by pins 44.

The motors 39 are carried by cross members 45, one of these cross members being pivotally secured to one side rail 8 and the other one being pivotally secured to the other side rail 8 as shown in Figure 1. The other end of each of these members is supported by a rubber compression spring 46 surrounded by a coil spring 47 (Figure 6) housed by the bracket 34. A similar rubber spring 48 and a similar coil spring 49 is placed between the top of each member 45 and that part of the bracket 34 immediately thereabove.

The liberal use of rubber in the truck serves to damp the high frequency oscillations between the frame and the car body expected to be carried by the bolster at its center bearing 50. The rubber, as illustrated, will give proper springing and riding characteristics for vertical and horizontal forces and, by virtue of the hysteresis developed by it provides valuable inherent damping. The frictional value of rubber against steel is also such that no other damping will be needed in many types of services to which this truck may be adapted.

Various changes may be made in the arrangement, size and design of parts without departing from the spirit of my invention and I therefore desire to be extended protection as defined by the appended claims.

What I claim is:

1. The combination of a composite spring and load imposing and load receiving members for said spring, said spring comprising three concentric springs, the outer one and the intermediate one of said springs comprising a vertical stack of rubber rings separated by metallic rings, each of said metallic rings being frusto-conical intermediate the top and bottom of said springs, said rings being surface bonded in pairs to a common metallic ring and to other rings at their faces opposite to the face bonded to said common ring, the adjacent metallic rings of adjoining pairs being secured together by dowels against lateral displacement, said load imposing and load receiving members being relatively movable vertically to impose compression loading on said rubber rings, said members being relatively movable laterally to impose shear loading on said rubber rings, said metallic rings by their frusto-conical shape and said dowels maintaining said rubber rings against relative bodily displacement under relative lateral movements of said members.

2. In a rail truck, the combination of a truck frame, a bolster supported by said frame and a composite spring interposed between the side rails of said frame and each end of said bolster, said spring comprising a plurality of concentric member springs each composed of a stack of rubber rings separated by horizontally disposed frusto-conical metal rings, said springs each resisting relative vertical movements of said bolster and said frame in compression and resisting relative lateral movements of said frame and said bolster by a combination of shear and compression.

3. In a rail truck, the combination of a truck frame, a bolster supported by said frame and a composite spring interposed between the side rails of said frame and each end of said bolster, said spring comprising a plurality of concentric member springs each composed of a stack of rubber rings separated by horizontally disposed frusto-conical metal rings, the outer member spring of said composite springs resting on said side rails, the intermediate member thereof being supported by the top of said outer member spring and, in turn, supporting the inner member spring from the top thereof whereby said springs resist vertical loading in series and in compression, said bolster being supported by the top of said inner member spring, said springs jointly resisting relative lateral movements of said bolster with respect to said frame by a combination of shear and compression.

EMIL H. PIRON.

REFERENCES CITED

The following references are of record in the file of this patent:

UNITED STATES PATENTS

| Number | Name | Date |
|---|---|---|
| 1,825,093 | Sansburn | Sept. 29, 1931 |
| 2,039,759 | Webb | May 5, 1936 |
| 2,061,767 | Hobson | Nov. 24, 1936 |
| 2,113,964 | Robinson et al. | Apr. 12, 1938 |
| 2,165,702 | Haushalter | July 11, 1939 |
| 2,201,861 | Hanna | May 21, 1940 |
| 2,207,848 | Barrows | July 16, 1940 |
| 2,231,848 | Eksergian | Feb. 11, 1941 |
| 2,260,508 | Chambers | Oct. 28, 1941 |

FOREIGN PATENTS

| Number | Country | Date |
|---|---|---|
| 432,304 | Great Britain | July 21, 1935 |